United States Patent
Kejha

(10) Patent No.: US 6,251,540 B1
(45) Date of Patent: Jun. 26, 2001

(54) COMPOSITE ELECTRODE FOR ELECTROCHEMICAL DEVICES HAVING A METALLIZED GLASS OR CERAMIC FIBER CURRENT COLLECTOR

(75) Inventor: Joseph B. Kejha, Meadowbrook, PA (US)

(73) Assignee: Lithium Technology Corporation, Plymouth Meeting, PA (US)

( * ) Notice: Subject to any disclaimer, the term of this patent is extended or adjusted under 35 U.S.C. 154(b) by 0 days.

(21) Appl. No.: 09/006,057

(22) Filed: Jan. 12, 1998

Related U.S. Application Data

(63) Continuation-in-part of application No. 08/724,862, filed on Oct. 23, 1996, now Pat. No. 5,750,289.

(51) Int. Cl.[7] .................................................. H01M 4/64
(52) U.S. Cl. ........................ 429/233; 429/237; 429/241; 429/245
(58) Field of Search .................................. 429/233, 237, 429/241, 244, 245

(56) References Cited

U.S. PATENT DOCUMENTS

| | | | |
|---|---|---|---|
| 5,045,170 | * | 9/1991 | Bullock et al. ............... 204/280 |
| 5,232,797 | * | 8/1993 | Moulton et al. ............... 429/210 |
| 5,294,319 | * | 3/1994 | Kaczur et al. ................. 204/290 |
| 5,348,817 | * | 9/1994 | Rao et al. ...................... 429/210 |
| 5,766,789 | * | 6/1998 | James et al. ................... 429/44 |

* cited by examiner

Primary Examiner—Stephen J. Kalafut
Assistant Examiner—M. Wills
(74) Attorney, Agent, or Firm—Seidel, Gonda, Lavorgna & Monaco, P.C.

(57) ABSTRACT

A composite electrode for an electrochemical device wherein the current collectors and carriers are incorporated into at least one of the electrodes, which are used in alkali metal electrochemical devices, and alkali metal-ion electrochemical devices, which current collectors and carriers are a net of metallized glass or ceramic fibers which may be plasma etched prior to metallizing, and which are woven or non-woven.

13 Claims, 1 Drawing Sheet

COMPOSITE ELECTRODE FOR ELECTROCHEMICAL DEVICES HAVING A METALLIZED GLASS OR CERAMIC FIBER CURRENT COLLECTOR

CROSS REFERENCE TO RELATED APPLICATION

This application is a continuation in part of my prior Application Ser. No. 08/724,862 filed Oct. 23, 1996 now U.S. Pat. No. 5,750,289; Entitled: LIGHT WEIGHT CURRENT COLLECTORS AND CARRIERS.

BACKGROUND OF THE INVENTION

1. Field of the Invention

This invention is directed to electrodes of electrochemical devices which incorporate a woven or non-woven glass or ceramic fiber mesh or net with a metallic coating thereon.

2. Description of the Prior Art

Electrochemical devices such as electric batteries of the solid state type consist of at least an anode, a layer of electrolyte, and a cathode. The batteries require a base current collector and carrier for both the anode and the cathode. Various materials have been proposed for use as the base current collector and carrier, but none of them are entirely satisfactory.

Metallized plastic fiber nets do not possess optimal stiffness to resist shrinkage after coating by active materials, which can lead to curling and require additional calendering.

In addition glass or ceramic fiber nets of the same dimension, can be made lighter than nets formed from plastic fibers.

In the U.S. Patents to Hope et al., U.S. Pat. Nos. 4,794,059; 4,861,690; and 4,960,655 carbon fiber and graphite material in the form of a solid ribbon, or a woven or non-woven mesh are described which are used as base current collectors and carriers. While graphite and carbon in solid ribbon or mesh form are satisfactory for their intended purpose, the carbon fiber non-woven fabric is usually of 4 mils thickness, is heavier than polyethylene and other plastics, and also costs more than is optimal. Since the base current collector and carrier often account for as much as 50% (percent) of total battery weight, a reduction in the weight is desirable and will also increase the energy density of the battery.

In Japanese Patent No. 58-61566 (a) a production method for a lead storage battery is described where a lattice structure of synthetic resin with a cross-section of circular shape is immersed in melted lead so as to form a thin lead film on the surface of the lattice structure. The disclosed resin material is polyproproplene, this structure is restricted to lead batteries, and would not be suitable for use in other electrochemical devices as described by applicant.

In Japanese patent No. JA-7303501-R an electrode grid for lead accumulators is described which comprises a plastic film with holes, that has been coated by vacuum and electroplating of lead on the plastic film. This structure is only useful with lead batteries, and not suitable for other electrochemical devices as described by applicant.

In Japanese Patent NO. 55-39180 (A) a method of production for the electrode base of a cell is described. A porous member such as felt or unwoven cloth of polypropylene, or polyethylene is immersed in a binder solution that contains conductive powder such an nickel, iron, or carbon powder. The porous member is dried and non-electrolyte and electronic galvanization with nickel are non-electrolyte and electronic galvanization with nickel are performed to obtain a nickel layer on the member. This does not suggest the structure as described by applicant. The whole Japanese patent structure including powder is metallized after coating, while applicant only metallizes the fibers, which are of a different material than the Japanese patent.

In the German patent No. DT 2721560 expanded metal grids used as lead accumulator plates are described. The grids are made from a strip of stiff lead-antimony alloy or plastic resistant to $H_2SO_4$, which is coated on one or both sides with a rolled sheet or strip of lead-antimony, which is then made into expanded metal in the conventional manner. This structure is not suitable for use in other than lead acid batteries, and does not suggest applicant's structure which is used in other than lead acid batteries.

In the U.S. Patent to Drews et al., U.S. Pat. No. 5,139,902, an electrode is described which comprises a grid plate, which serves as the carrier for battery active material and for current supply and return. The grid plate includes woven plastic threads which are rendered electrically conductive by coating with a conductive layer of metal, and additionally metallized by coating with at least one coating of a lead-tin alloy or lead alone. The grid plate is further divided into two dimensional zones for storage of the active material, and current conducting zones for current supply and return. This plate which is described as having a thickness of 4 mils to ⅛ inch is useful only for lead acid batteries, and does not suggest the structure described by applicant.

In the U.S. Patent to King et al., U.S. Pat. No. 4,129,692 an electrode structure for an electrochemical cell in lead acid batteries is described, which is a fibrous support of organic polymeric material of a thickness of 0.1 to 3 mm, which has a pattern of solid conductors thereon, which extend over the surface of the porous support from current take-off regions to spaced regions, with electrochemically active material deposited on the fibrous material, which has had metal deposited thereon or wires to provide the electrical conductors. This structure is much thicker than applicants'. In addition, the King et al. structure is intended for use with lead acid batteries, and would not be suitable for the structures described by applicant.

SUMMARY OF THE INVENTION

It has now been found that a composite electrode for electrochemical devices, which uses a current collector having metallized glass fibers or ceramic fibers which are woven or non-woven, provides a structure of lighter weight than similar structure with metalized plastic fibers, possesses the required current collecting capability, which is stiff, resistant to shrinkage, has a long operating life, increases energy density, reduces the weight considerably, is economical, is suitable for mass production and provides numerous other benefits.

The principal object of the invention is to provide composite electrodes for electrochemical devices which have metallized glass or ceramic fiber current collectors, are strong, lightweight, inexpensive, resistant to shrinkage, and which fiber current collectors are not reactive with the components of the electrochemical devices.

A further object of the invention is to provide composite electrodes of the character aforesaid that are suitable for mass production.

A further object of the invention is to provide composite electrodes of the character aforesaid that are simple and inexpensive to construct.

A further object of the invention is to provide composite electrodes of the character aforesaid that are useful with a wide variety of electrochemical devices.

A further object of the invention is to provide composite electrodes of the character aforesaid which help to improve the energy density of the electrochemical devices into which they are incorporated.

A further object of the invention is to provide composite electrodes of the character aforesaid which have current collectors which are of lighter weight than plastic net current collectors.

Other objects and advantageous features of the invention will be apparent from the description and claims.

BRIEF DESCRIPTION OF THE DRAWING

The nature and characteristic features of the invention will be more readily understood from the following description taken in connection with the accompanying drawing forming part hereof in which.

Figure 1:
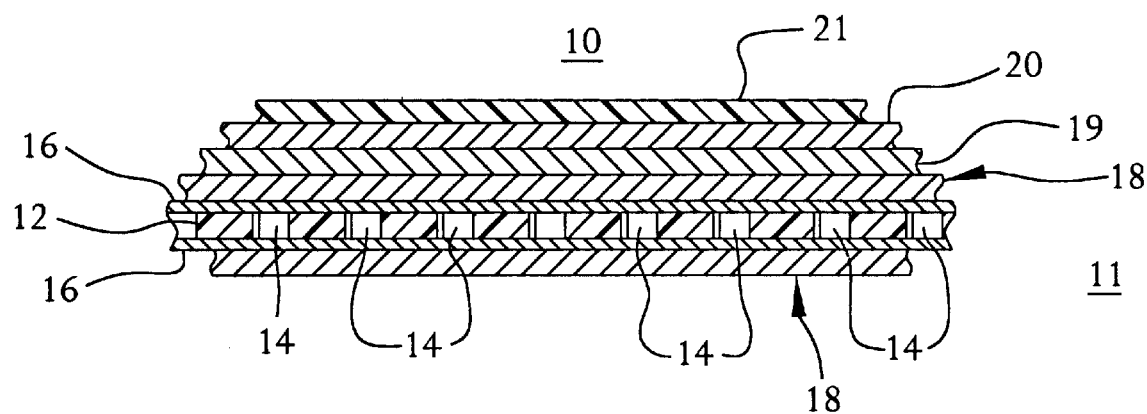
FIG. 1 is a diagrammatic view of a composite electrode having a metallized glass or ceramic fiber current collector.

It should, of course, be understood that the description and drawings herein are merely illustrative and that various modifications and changes can be made in the structures disclosed without departing from the spirit of the invention.

DESCRIPTION OF THE PREFERRED EMBODIMENTS

Referring now more particularly to the drawing a typical electrochemical device such as an alkali metal-polymer battery 10 is illustrated, which incorporates the composite electrode 11 of the invention.

Alkali metal-polymer batteries such as alkali metal or alkaline earth metal-polymer batteries, and alkali metal-ion-polymer batteries, and for example lithium polymer batteries, or lithium-ion-polymer batteries, consist of at least an anode or negative electrode, a polymer ion-conductive layer, and a cathode or positive electrode. Such batteries can be of virtually any desired size and configuration, and usually include additional layers such as current conducting backing layers, insulating layers and connection layers. In batteries with liquid electrolytes, the polymer is replaced by a porous membrane containing liquid electrolyte.

For purposes of illustration, the alkali metal battery 10 to be described is of the lithium metal type, but other alkali metal or alkaline earth metals can be used if desired.

The electrode 11 as illustrated includes a non-woven glass fiber current collector which has a plurality of holes 14 therein.

The net 12 is preferably plasma etched, and is coated by any well known method for metallizing such as vacuum vapor deposition, magnetron sputtering, or electroless metal plating, or metallized by the described methods and electroplated, which coating 16 is of metal, which is selected to be compatible with the battery chemistry and components. The coating 16 may be on one or both sides of, or may completely encapsulate, the net 12. The coating 16 supports the specific current collecting and carrying capabilities as required by the device in which it is incorporated, with a metallized coating of copper, aluminum, nickel, or chrome being particularly suitable.

The coating 16 does not close the holes 14, which holes can take up to approximately 90% (percent) of the surface area of the net 12.

The net 12 for a piece of 2×3 inches size non-woven glass fiber weighs 0.04 g, while the same thickness of non woven polyester would weigh approximately 0.10 g.

Since the net 12 is used in a cathode, it is coated with additional layers 18 of cathodic composition of well known type, which may have finely ground particles of an intercalation compound such as vanadium oxide compound $V_6O_{13}$, mixed with an organic solvent, polymer, alkali salt, and carbon black.

The resultant cathode 11 has the current collector 12 embedded in the described composition matrix. Additional layers may be applied to form the complete electrochemical device. The layer 18 may have a layer 19 of polymeric electrolyte applied thereto which may be a thin layer of polyethylene oxide compounded with a lithium salt.

The layer 19 may have an anodic layer 20 applied thereto which may be an alkali metal foil or alkali metal alloy foil.

Layer 20 may optionally have a metallized expanded or perforated plastic film 21 added on top thereto as a current collector. If only one side of film 21 is metallized, then the metallized side should face layer 20.

If it is desired to construct a lithium-ion battery, the anode is of similar construction as the cathode 11, except that the oxide compound is replaced by a carbon compound.

The metal selected for coating should be compatible with the particular chemistry of the battery. For example in lithium batteries, copper is the preferred metal for the anode, and aluminum is preferred for the cathode.

For other types of batteries, capacitors or fuel cells, appropriate chemistry layers may be applied on described current collectors/carriers. It should be noted that capacitors include a dielectric layer between electrodes.

The net 12 may also be of metallized ceramic fibers of well known type, such as zirconium, or other materials, having similar properties as the illustrated glass fibers.

Figure 2:
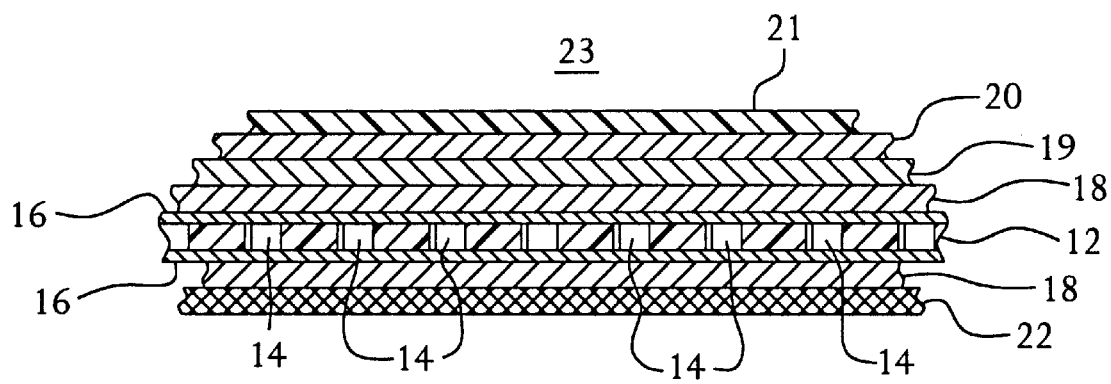
FIG. 2 is a view similar to FIG. 1 with an additional collector.

In addition the glass or ceramic fiber nets may be combined with other metalized fiber collectors or metal grids, foils or metalized films to provide ultra high rate capability multiple collectors. such as with collector 22, in the cell 23 as shown in FIG. 2.

It will thus be seen that structures have been provided with which the objects of the invention are achieved.

I claim:

1. An alkali metal polymer electrochemical device wherein a coated current collector is included in at least one of the electrodes, which device includes a negative electrode, a polymer ion conductive layer, and a positive electrode, wherein the current collector consists of
   a net of metallized glass fibers, with the metal selected from the group consisting of nickel, copper, aluminum, and chromium.

2. An alkali metal electrochemical device wherein a coated current collector is included in at least one of the electrodes, which device includes a negative electrode, a polymer ion conductive porous membrane with liquid electrolyte therein, and a positive electrode, wherein the current collector consists of
   a net of metallized glass fibers, with the metal selected from the group consisting of nickel, copper, aluminum, and chromium.

3. An alkali metal polymer electrolyte electrochemical device wherein a coated current collector is included in at least one of the electrodes, which device includes a negative electrode, a dielectric layer, and a positive electrode, wherein the current collector consists of a net of metallized glass fibers with the metal selected from the group consisting of nickel, copper, aluminum, and chromium.

4. An alkali metal polymer electrochemical device as defined in claim 1 in which said net is woven.

5. An alkali metal polymer electrochemical device as defined in claim 1 in which said net is non-woven.

6. An alkali metal electrochemical device as defined in claim 2 in which said net is woven.

7. An alkali metal electrochemical device as defined in claim 2 in which said net is non-woven.

8. An alkali metal polymer electrochemical device as defined in claim 3 in which said net is woven.

9. An alkali metal polymer electrochemical device as defined in claim 3 in which said net is non-woven.

10. An alkali metal electrochemical device as defined in claim 1 or 2 or 3 in which said net is plasma etched before metallizing.

11. An alkali metal electrochemical device as defined in claims 1 or 2 or 3 in which an additional current collector is provided in which said net is combined with said additional current collector.

12. An alkali metal electrochemical device as defined in claim 2, which device is an alkali metal-ion-electrochemical device.

13. An alkali metal polymer electrochemical device as defined in claim 1 or 3, which device is an alkali metal-ion-polymer electrochemical device.

* * * * *